Patented May 17, 1949

2,470,394

UNITED STATES PATENT OFFICE 2,470,394

FURFURYL ALCOHOL COMPOUNDS

Eustace Glycofrides, Toledo, Ohio, assignor to Owens-Illinois Glass Company, a corporation of Ohio No Drawing. Application February 13, 1946, Serial No. 647,434

6 Claims. (Cl. 260—17.4)

My invention relates to resins which are the reaction products of furfuryl alcohol reacted with different catalysts in succession, and to molding powders or materials comprising such resins compounded with suitable fillers and other materials. The invention comprises novel methods for producing such resins and molding compounds and provides thermo-setting resins and molding powders suitable for compression molding of various articles.

It has been found that in reacting furfuryl alcohol in the presence of metallic halides or mineral acid catalysts, the usefulness of the resin thereby produced is limited because of its thermoplastic character.

An object of the present invention is to provide a novel and practical method of furthering the reaction of such resins to a useful thermo-setting stage, such method comprising the use of an organic acid, either mono-basic or dibasic. Examples of organic acids suitable for such process are benzoic, formic, lactic, phthalic, tartaric, tannic, maleic, fumaric and oxalic acid. The amount of such an organic acid required to react as a catalyst with the thermoplastic resin depends largely upon the desired speed of the reaction. The smaller the amount of the catalyst, the slower the reaction. The amount of the organic acid necessary to produce this catalytic effect may be within the range of 1 to 10% of the amount of furfuryl alcohol.

The thermoplastic resin which is produced by the reaction of the furfuryl alcohol with a metallic halide or a mineral acid catalyst, is adapted for use in producing a molding compound of the thermo-setting type. For this purpose, the organic acid is added to the resin and other constituents of the molding compound including a filler. This may be done while working the compound on the rolls.

Examples of the metallic halides which may be used in making the thermoplastic resin in accordance with my invention are $FeCl_3$, $AlCl_3$, and $SnCl_4$. Other of the halides including metallic fluorides, bromides, and iodides may also be used. The use of the lower valence metal halides such as ferrous chloride and stannous chloride should be avoided. The halides best suited for the purpose of my invention are those of an acid nature as indicated by the hydrogen ion concentration. Mineral acids such as HCl and $H_2SO_4$ may also be employed as substitutes for the halides.

The percentages and proportions of parts herein specified are by weight and the temperatures given are centigrade.

In making the original resin, the metallic halide or mineral acid and the furfuryl alcohol are reacted, for example, in a flask with a condenser. This reaction may take place at a temperature of 60° to 70° C., but must be kept below 100° C. If the temperature is raised above 100° C., an exothermic reaction takes place which is detrimental and is not easily controlled. The desired end point of the reaction is reached when a sample cooled to room temperature (20° C. to 24° C.) becomes a solid.

Sometimes a liquid resin is preferred to the solid resin, depending upon the specific methods of producing the molding compound. In this case the reaction is arrested at an earlier stage, the end point being determined by the viscosity of the reacted mixture. This liquid or viscous state is found advantageous in cases where a kneader is to be used for mixing the resin with the filler and other ingredients, for further reaction to produce the final molding compound.

The organic acids such as above specified are capable of producing a catalytic effect upon the furfuryl alcohol resin and any selected acid of those named can be used in preparing the molding compound by introducing the acid along with the resin and other ingredients in a mixer or on the hot rolls. The organic acid advances the cure to such a point that when the compound is subjected to heat and pressure within a mold, it produces a satisfactory molded article. The application of heat to the compound after removal from the masticator or rolls, either before or after being reduced to powdered form, is also useful in furthering the reaction to the proper stage for molding purposes.

Examples of methods of producing molding compounds in accordance with the present invention are as follows:

*Example 1*

One hundred parts commercial furfuryl alcohol, and one part $FeCl_3$ by weight, are reacted in a flask with a condenser, the temperature being kept within a range of 60° to 100° C., until an end point is reached at which a sample on cooling is solid. The resin so produced is mixed with 1 to 10 parts by weight of benzoic acid, (the weight being on the basis of 100 parts of the alcohol) wood flour filler, aluminum stearate, stearic acid and carbon black, the parts being mixed in a kneader or masticator or Banburry mixer while a temperature within the range of about 16° C. to 116° C. is maintained. When the proper degree of flow and cure has been obtained, the material is cooled, ground and screened and then may be used as a thermo-setting molding powder.

Commercial furfuryl alcohol is specified in the above example, as the impurities therein are not found to be detrimental to its use for the purpose of the present invention. The amount of $FeCl_3$ used may be varied within a range of ½ to 2% of the alcohol. In place of the iron chloride given in the above example, other metallic halides such as $AlCl_3$ or $SnCl_4$ may be used in like amount or within the specified range. Also in place of the iron chloride a mineral acid as, for example, HCl or $H_2SO_4$ may be substituted in like amount or range and reacted at the temperature specified for the reaction with $FeCl_3$.

The proportions of the ingredients used in the above example may be within the following ranges:

| | Percent |
|---|---|
| Resin | 45 to 52 |
| Wood flour | 52 to 45 |
| Aluminum stearate or zinc stearate | ½ to 2 |
| Carbon black (or other coloring matter) | 1 to 2 |

Instead of the benzoic acid specified in Example 1, other carboxylic acids could be used, such as phthalic, tannic, formic, lactic, maleic, fumeric, oxalic and tartaric acid.

Example 2

Furfuryl alcohol is reacted with a metallic halide as in Example 1. The resin thus produced and which may be in the form of a dough, is mixed on cool rolls with from 1 to 10% of benzoic acid or any of the of other above mentioned organic acids, until the mixture is uniform. The other ingredients necessary to make the molding compound, are then added, such other ingredients including wood flour or other filler, a lubricant such as aluminum stearate or zinc stearate, and coloring material, in the proportions above specified. The temperature of the rolls is then raised to 120° C., and the material manipulated until it becomes hard and tough. Other fillers may be substituted for the wood flour, such for example, as a lignin enriched filler or other conventional or approved filler materials adapted for use in making molding compounds.

Modifications may be resorted to within the spirit and scope of my invention.

I claim:

1. The method which comprises reacting 100 parts furfuryl alcohol with ½ to 2 parts by weight of $FeCl_3$ at a temperature within the range of 60° C. to 100° C. and thereby producing a thermoplastic resin, mixing the said resin with 1 to 10 parts by weight of benzoic acid, wood flour filler, aluminum stearate and carbon black, mixing the said ingredients and reacting them at a temperature within the range of 16° C. to 116° C.

2. The method which comprises reacting 100 parts furfuryl alcohol with ½ to 2 parts by weight of $FeCl_3$ at a temperature within the range of 60° C. to 100° C. and thereby producing a thermoplastic resin, mixing the said resin with 1 to 10 parts by weight of benzoic acid, wood flour filler, aluminum stearate and carbon black, mixing the said ingredients and reacting them at a temperature within the range of 16° C. to 116° C., the said ingredients being in substantially the following proportions, said thermoplastic resin 45% to 52%, wood flour 52% to 45%, aluminum stearate ½ to 2%, and carbon black 1% to 2%.

3. A molding compound which is the reaction product of the method defined in claim 2.

4. The method which comprises reacting 100 parts of furfuryl alcohol with ½ to 2 parts of a metallic halide of an acid nature, other than ferrous chloride and stannous chloride, at a temperature within a range of 60° C. to 100° C. and thereby producing a thermoplastic resin, thereafter mixing said resin on cool rolls with an organic acid of the group consisting of benzoic acid, formic acid, lactic acid, tartaric acid, phthalic acid, tannic acid, maleic acid, fumaric acid, and oxalic acid until the mixture is of uniform consistency, the said acid being in the proportion of 1% to 10% of the furfuryl alcohol, then adding wood flour, then raising the temperature of the rolls to 120° C. and manipulating until the material becomes hard and tough, said wood flour and thermoplastic resin being in approximately equal proportions.

5. A molding compound which is the reaction product of the method defined in claim 4.

6. The method which comprises reacting 100 furfuryl alcohol with one part by weight of a catalyst consisting of a metallic halide of an acid nature, other than ferrous chloride and stannous chloride, at a temperature within a range of 60° C. to 100° C., and thereby producing a thermoplastic resin, and thereafter combining the said resin and an organic acid, the amount of acid being 1 percent to 10 percent of that of the furfuryl alcohol, and furthering the reaction at a temperature above room temperature and not above 116° C. and thereby producing a thermosetting compound, said organic acid being an acid of the group consisting of benzoic acid, formic acid, lactic acid, tartaric acid, phthalic acid, tannic acid, maleic acid, fumaric acid, and oxalic acid.

EUSTACE GLYCOFRIDES.

REFERENCES CITED

The following references are of record in the file of this patent:

UNITED STATES PATENTS

| Number | Name | Date |
|---|---|---|
| 1,665,235 | Trickey | Apr. 10, 1928 |
| 2,323,333 | Kauth | July 6, 1943 |
| 2,345,966 | Fiedler | Apr. 4, 1944 |
| 2,366,049 | Payne | Dec. 26, 1944 |